United States Patent Office 3,480,022
Patented Nov. 25, 1969

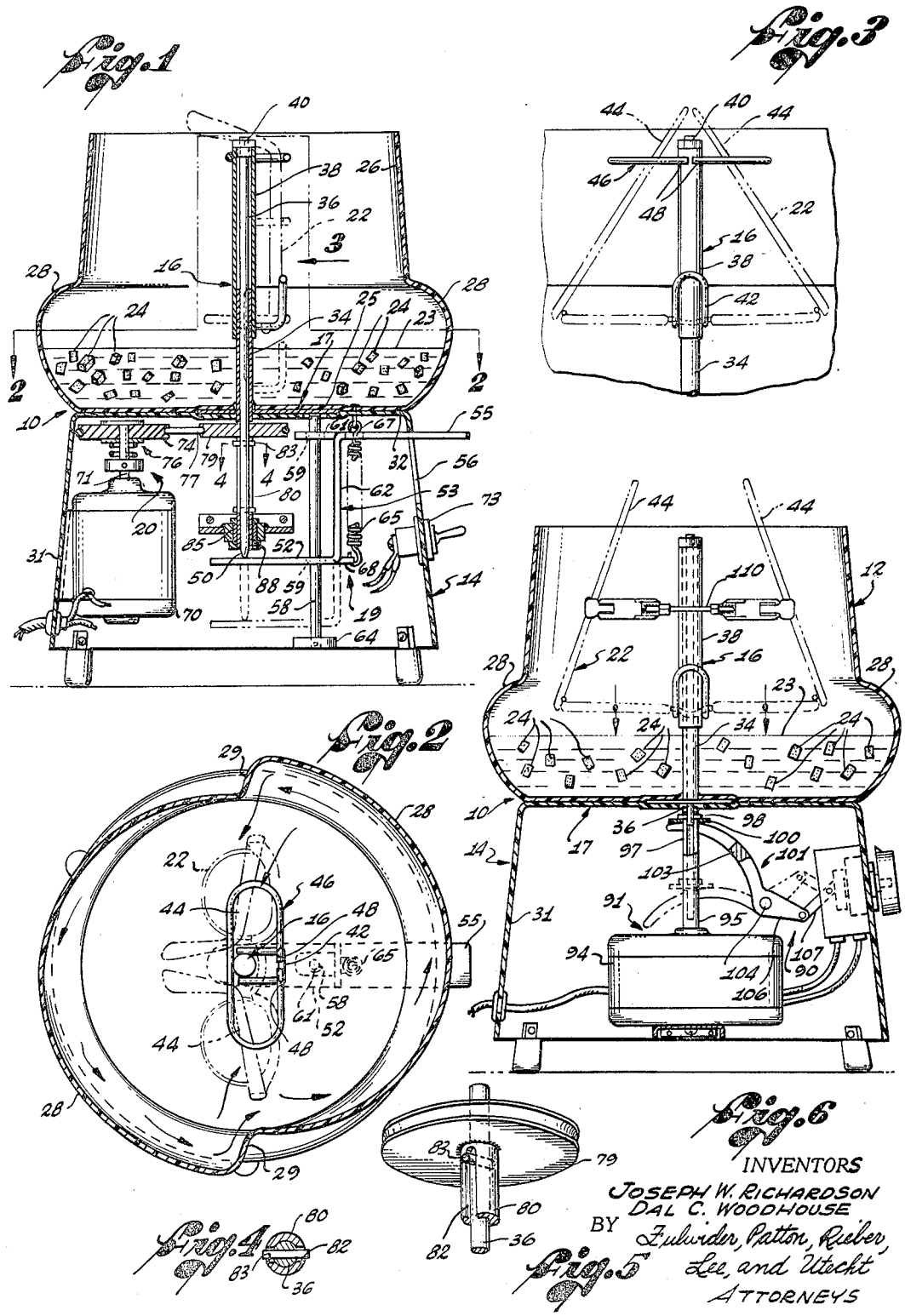

3,480,022
CLEANING DEVICE FOR EYEGLASSES
Joseph W. Richardson, 80—209 Ave. 50, and Dal C. Woodhouse, 50—462 Jefferson St., both of Indio, Calif. 92201
Filed Aug. 25, 1967, Ser. No. 663,296
Int. Cl. B08b 3/10, 11/02
U.S. Cl. 134—112                    10 Claims

ABSTRACT OF THE DISCLOSURE

Apparatus for cleaning eyeglasses having a bowl containing a suitable cleaning fluid and a centrally mounted, rotatable eyeglass supporting rack. An actuating lever mechanism is provided for lowering and raising the rotating rack and eyeglasses into and out of the cleaning fluid. Suitable and drying rotational speeds are provided by a friction clutch. A portion of the bowl has an interrupted annular concave shape to cause the cleaning fluid to flow upwardly and inwardly over the glasses as they are rotated. An alternate form of the driving mechanism provides automatic raising and lowering of the supporting rack.

BACKGROUND OF THE INVENTION

The present invention relates to cleaning devices and more particularly to a novel, mechanical device for cleaning eyeglasses.

It is practically inherent in the nature of conventional eyeglasses that they will regularly and often become dirty and require cleaning. Since eyeglasses are worn so that they are exposed to the air, common dirt, dust and lint floating in the air can easily find a way onto the lens or frame of the glasses. In addition, substantial portions of the frame, and often the lens itself, are commonly in contact with part of the wearer's face, resulting in skin oils and moisture being transferred to the glasses. Also, such oils and moisture cause the free-floating dirt and lint in the air to stick to the frame and lens of the glasses.

Because of the lens of most eyeglasses occupies a substantial part of the frame portion, fingerprints and smudges on the lens are a common occurrence when the glasses are put on, taken off or adjusted.

There are many different ways of cleaning eyeglasses. Depending upon the circumstances, the method of cleaning may vary from simply wiping the lens with a handkerchief to washing the entire pair of glasses with soap and water. Simply wiping the lens with a handkerchief or tissue is obviously unsatisfactory because oils and films are merely spread about the lens and are not removed. Also, oil and dirt on the other parts of the eyeglass frame are difficult, if not impossible, to remove with this method. Full-scale washing with soap and water is equally unsatisfactory because the time required for washing and rinsing and, further, drying the glasses with a towel may easily result in dust and lint being transferred to the lens from the towel, defeating the washing operation.

In an attempt to provide a simple but effective cleaning of eyeglasses, various products have appeared from time to time, such as silicon-treated tissues and cleaning solutions containing some form of detergent. All of these products require the lens or frame to be rubbed with some form of tissue or towel with a resultant likelihood of smearing, streaking or scratching the lens in the cleaning process. In addition, such products are designed for cleaning the lens only and body oils and moisture are not removed from the sharp corners and crevices of the frame.

SUMMARY OF THE INVENTION

To solve the problems in cleaning eyeglasses described above, the present invention provides a mechanical cleaning device in which glasses are cleaned without rubbing the lens or frame of the glasses either to clean or dry them. The glasses are inserted into the cleaning device and are not removed until both the lens and the frame surrounding the lens have been completely cleaned and dried. The glasses are placed on a rack which rotates within a bowl containing a fluid cleaning agent. The rack is rotated with the lens and frame surrounding the lens of the glasses lowered into the fluid. The rotation of the eyeglasses in the fluid sets the fluid in motion and that motion is controlled by the inside shape of the bowl to produce more effective cleaning. In addition, a number of small random sized sponges are provided in the cleaning fluid to further increases the speed and effectiveness of the cleaning operation. When the cleaning is completed, the eyeglass rack and the carried glasses are raised from the fluid and spun dry. A slightly volatile cleaning agent is employed to aid the quick drying of the glasses without streaking.

All portions of the eyeglass lens and frame surrounding the lens are quickly and thoroughly cleaned and dried due to the control of fluid motion with the sponges and spin dry features of the present cleaning device.

DESCRIPTION OF THE DRAWINGS

FIGURE 1 is a sectional elevational view of the eyeglass cleaning device with a pair of glasses shown in phantom in place on the device;

FIGURE 2 is a horizontal sectional view taken along the line 2—2 of FIGURE 1;

FIGURE 3 is an elevational view of a portion of the cleaning device taken in the direction of line 3—3 of FIGURE 1;

FIGURE 4 is a sectional view taken along the line 4—4 of FIGURE 1;

FIGURE 5 is a perspective view of a portion of the cleaning device; and

FIGURE 6 is a sectional elevational view of the cleaning device showing alternate forms for the eyeglass rack and driving mechanism assembly.

DESCRIPTION OF THE PREFERRED EMBODIMENTS

Referring to the drawings, and FIGURES 1 and 2 in particular, the eyeglass cleaning device has a generally cylindrically shaped housing 10 with a slight outward taper from top to bottom and is preferably made of fiberglass or a similar material. The housing 10 has an upper bowl section 12 open at its top and a lower mounting section 14 which houses portions of the operating mechanism of the cleaning device. The operating mechanism comprises an eyeglass rack assembly 16 which extends upwardly from the center of a wall 17 separating the bowl section 12 and the mounting section 14, and an actuating assembly 19 and drive assembly 20 housed in the mounting section of the housing 10. The rack assembly 16 supports and carries a pair of eyeglasses 22 so that the lens and surrounding frame face downward within the bowl section 12 during the cleaning process, as shown in FIGURE 3. The rack assembly 16 is adapted for both rotational movement about, and longitudinal movement along, its axis. The bowl section 12 contains a suitable cleaning fluid 23, with a number of small random sized sponges 24 and, when the rack assembly 16 is in its upper position, the frame and lens of the eyeglasses 22 are above the level of the cleaning fluid.

Cleaning of the eyeglasses 22 is accomplished by lowering the rack assembly 16 and glasses 22 into the cleaning fluid 23 by means of the actuating assembly 19, rotating the rack assembly for a predetermined cleaning period by means of the drive assembly 20, and then raising the rack assembly and eyeglasses out of the cleaning fluid for spin drying. The configuration of the drive assembly 20 is such that the rotational speed of the rack assembly during the spin drying phase of the cleaning process is substantially greater than the rotational speed during the cleaning step when the glasses 22 are submerged in the cleaning fluid 23 to prevent excessive splashing during cleaning.

More particularly, bowl section 12 of the housing 10 is generally cylindrically shaped with a bottom portion 25 and side wall 26 tapering inward slightly toward the top. A generally annular concave depression 28 extends outwardly from the lower portion of the side wall 26. The concave depression 28 curves relatively sharply back to the generally vertical shape of the remainder of the side wall 26 to form a pair of interruptions 29, best seen in FIGURE 2. From each of the interruptions 29, the concavity of the depression 28 circumferentially increases until the following interruption is reached. The concave depressions 28 and interruptions 29 serve to control and modify the fluid flow during the cleaning process.

The lower mounting section 14 of the housing 10 is also generally cylindrical in shape with a side wall 31 which tapers outwardly slightly to an open bottom. The mounting section 14 is attached to the bowl section 12 by means of an integral top portion 32 adjacent the bottom portion 25 of the bowl section. The connected bottom portion 25 of the bowl section 12 and the top portion 32 of the mounting section 14 form the wall 17 which separates the two sections.

The rack assembly 16 includes a baffle tube 34 which extends vertically and centrally through the wall 17 into the bowl section 12. The baffle tube 34 is rigidly mounted at its lower end in the wall 17 and extends only approximately half way into the bowl section 12 of the housing 10. The normal level of the cleaning fluid 23 is well below the top of the baffle tube 34 and so the tube prevents the fluid from entering the lower section 14 but affords a passageway between the two sections.

A spindle 36 passes through the baffle tube 34 and is free to rotate and telescope within it. A sealing tube 38 is concentrically disposed about both the spindle 36 and baffle tube 34 and is rigidly attached to the top 40 of the spindle 36. The fit between the sealing tube 38 and the baffle tube 34 is relatively close, but the sealing tube 38 is free to telescope along, and rotate about, the baffle tube. The combination of the baffle tube 34, the spindle 36 and sealing tube 38 then affords a mechanical connection to the actuating and drive assemblies 19, 20 in the mounting section 14 of the housing 10, and also effectively prevents the cleaning fluid 23 from entering the mounting section.

An L-shaped brace 42 is formed from plastic coated wire or other similar material and affixed to the lower portion of the sealing tube 38. The brace 42 is adapted to receive the nose bridge of the pair of eyeglasses 22 with the lens and frame of the eyeglasses being disposed on either side of the sealing tube.

The bow portions 44 of the eyeglasses 22 are held in vertical alignment by means of a bow cage 46 affixed near the top of the sealing tube 38. As shown in FIGURE 2, the bow cage 46 includes a pair of opposed U-shaped sections attached by an end of each to the sealing tube 38. The free ends 48 of the U-shaped sections are relatively flexible to afford easy insertion of the bow portions 44 of the eyeglasses 22, but the curved portions of the bow cage 46 are relatively stiff to constrain the bow portions 44 of the glasses against outward movement during rotation of the rack assembly 16.

The vertical position of the rack assembly 16 is controlled by the actuating assembly 19 mounted within the mounting section 14 of the housing 10. The lower end 50 of the spindle 36 rests on and is supported by a horizontal support arm 52 which is the lower branch of a Z-shaped actuating lever 53. The upper branch of the Z-shaped actuating lever forms a horizontal thumb extension 55 which extends beyond the side wall 31 of the mounting section 14 through a rectangular slot 56.

The actuating lever 53 is slidably mounted on a support rod 58 by means of holes 59 through the support arm 52 and a horizontal mounting tab 61 extending from the thumb extension 55. The axis of the holes 59 is parallel to a vertical center section 62 which connects the horizontal support arm 52 and thumb extension 55. The support column 58 is supported at its upper end by the wall 17 between the bowl section 12 and the mounting section 14 of the housing 10 and at its lower end by a bracket 64 attached to the side wall 31 of the mounting section.

As the actuating lever 53 is moved vertically up and down the support rod 58, the spindle 36 follows the support arm 52 raising or lowering the eyeglass rack assembly 16. For convenience, the actuating lever 53 and governed rack assembly 16 are biased in the upper position by means of a coil spring 65, the top end of which passes through a hole 67 in the thumb extension 55 and is attached to the wall 17. The lower end of the coil spring 65 is attached to a horizontal lug 68 extending from the support arm 52 on the side of the center section 62 of the actuating lever 53 opposite the support rod 58. The tension of the coil spring 65 is sufficient to maintain the rack assembly 16 and a carried pair of eyeglasses 22 in the upper position for the rack assembly. The rack assembly 16 and carried eyeglasses 22 are lowered into the cleaning fluid 23 by depressing the thumb extension 55 of the actuating lever 53 which in turn lowers the support arm 52 and supported spindle 36. Release of the thumb extension 55 allows the spring 65 to return the actuating lever 53 and the rack assembly 16 to their respective upper positions.

The eyeglass rack assembly 16 is rotated by the drive assembly 20 which includes, basically, an electric motor 70 and a pulley system. The electric motor 70 is mounted within the mounting section 14 of the housing 10 with its drive shaft 71 vertical and parallel to the spindle 36. A switch 73 mounted on the side wall 31 of the mounting section 14 is provided for turning the motor 70 on and off. A drive pulley wheel 74 is mounted on the end of the drive shaft 71 with the torque transferred to the pulley being controlled by a friction clutch assembly 76. Torque is transferred by means of a pulley belt 77 to a driven pulley wheel 79 mounted on a tubular sleeve 80 concentrically disposed around the extension of the spindle 36 below the wall 17. The sleeve 80 has a longitudinal slot 82 through it and a pin 83 passes through the spindle 36 and is keyed in the slot 82. The pin 83 locks the spindle 36 and sleeve 80 in rotational engagement, but does not prevent the spindle from telescoping within the sleeve. The length of the sleeve 80 is sufficient so that the slot 82 is long enough to allow the spindle 36 and carried eyeglass rack assembly 16 to move between suitable upper and lower positions for drying and cleaning the eyeglasses 22, respectively. The tubular sleeve 80 extends a short distance beyond the lower end of the slot 82 into a bearing 85 set in a bracket 86 which is attached to the side wall 31 of the mounting section 14. A collar 88 on the sleeve 80 prevents vertical downward movement of the sleeve past the bearing 85.

To operate the eyeglass cleaning device, a pair of eyeglasses 22 is first placed on the eyeglass rack assembly 16 with the nose bridge of the glasses being supported by the bridge brace 42 and the bow portions 44 of the glasses set into the bow cage 46. The eyeglass rack assembly 16 and carried glasses 22 are then lowered into the cleaning fluid 23 by depressing the thumb extension 55 of the actuating lever 53 and the motor 70 is turned on by means of switch 73. The resistance to rotation offered by the cleaning fluid 23 is sufficient so that the full torque developed by the motor 70 is not transferred to the drive pulley wheel 74 through the friction clutch 76. This results in a rotational speed of the eyeglass rack assembly 16 which is lower than that of the motor 70 to prevent excessive splashing during the cleaning phase.

As the eyeglass rack assembly 16 and carried eyeglasses 22 rotate, the cleaning fluid 23 moves about in the bowl section 12 in a generally circular pattern following the concave depression 28. The cleaning fluid 23 and sponges 24 are moving at such a speed in the concave depressions 28 that when they encounter one of the interruptions 29 the fluid and sponges are moved upwardly and inwardly and tend to fall upon the lens and frame portions of the eyeglasses 22, thereby increasing the effectiveness of the moving cleaning fluid and the cleaning process.

When the eyeglasses 22 are thoroughly cleaned, the actuating lever 53 is allowed to return to its upper position, thereby raising the eyeglass rack assembly 16 and eyeglasses 22 above the surface of the cleaning fluid 23. As the resistance to rotation of the air is considerably less than that of the cleaning fluid 23, the full rotational speed of the motor 70 is transferred through the friction clutch 76 to the drive and driven pulley wheels 74 and 79, respectively. Consequently, the rotational speed of the eyeglass rack assembly 16 and carried glasses 22 is considerably greater in the air and is sufficient to effectively spin dry the glasses in a short period of time, leaving no smears or water marks. The motor 70 is then turned off by means of switch 73 and the glasses 22 are removed from the eyeglass rack assembly 16.

An alternate form for the actuating and drive assemblies 90 and 91, respectively, is shown in FIGURE 6. As the remainder of the cleaning device is the same, like numbers indicate parts of the two forms which are the same. In the alternate form both the actuating and drive assemblies 90, 91 are centrally controlled by a timer 93 which both turns a two-speed drive motor 94 on and off and mechanically operates the cam-type actuating assembly 90. Thus, both the cleaning and drying steps of the cleaning process are automatically controlled by the timer 93.

In this form of the cleaning device, the motor 94 is mounted in the lower section 14 of the housing 10 with the axis of its drive shaft 95 coincident with the axis of the spindle 36 of the eyeglass rack assembly 16. The drive shaft 95 has the configuration of a hollow sleeve similar to that of a tubular sleeve 80 in the first form of the device. The drive shaft 95 also has a longitudinal slot 97.

When the eyeglass rack assembly 16 is in its upper position, the spindle 36 only extends into the mounting section 14 a distance sufficient for a pin 98 through the spindle to be keyed into the slot 97 in the drive shaft 95. The length of the pin 98 is such that it extends beyond the sides of the drive shaft 95 a sufficient distance to be supported by a washer 100 which is free to slide up and down the drive shaft. The eyeglass rack assembly 16 is supported through the pin 98 and washer 100 by a pivotal cam lever 101 which has a cam arm 103 which extends from a pivot point 104 to engage and support the bottom of the washer 100. The cam lever 101 also has a lever arm 106 which is mechanically linked through a linkage 107 to the timer 93.

The operation of this form of the cleaning device is similar to the first form in that the eyeglasses are first placed in the eyeglass rack assembly 16. In this form, however, the only further step required is that the timer 93 be turned on.

When the timer 93 is turned on, the linkage 107 pivots the cam lever 101 about the pivot point so that the cam arm 103 is lowered, as shown in phantom in FIGURE 6. The washer 100, pin 98 and consequently the spindle 36 and eyeglass rack assembly 16 follow the cam lever 101 and the eyeglasses 22 are lowered into the cleaning fluid 23. A switch in the timer 93 then turns the motor 94 on to its slow speed and the eyeglasses 22 are rotated in the cleaning fluid for an adequate cleaning period. The linkage 107 in the timer 93 then pivots lever 101 upward against the washer 100 and the eyeglass rack assembly 16 is raised out of the cleaning fluid 23. The switch in the timer 93 then turns the motor 94 to its high speed to spin dry the eyeglasses 22. After a sufficient drying period has elapsed, the timer 93 then turns the motor 94 off and the glasses 22 may be removed from the rack 16.

FIGURE 6 also shows a modified form for the eyeglass rack assembly 16. In place of the bow cage 46 of the first form, a cross-rod 110 which has spring clamps 111 at opposite ends is affixed to the sealing tube 38. The spring clamps 111 engage the bow portions 44 of the eyeglasses 22 to securely hold them in place during the cleaning process.

From the foregoing description, it will be appreciated that the present invention provides a mechanical eyeglass cleaning device which thoroughly cleans and dries a pair of eyeglasses in a comparatively short period of time. The time required for cleaning is further shortened by use of a specially shaped bowl section and numerous small sponges cooperating with the cleaning fluid. As shown, the cleaning device is susceptible to both manual and automatic operation, depending on the desires of the user.

What is claimed is:

1. A cleaning device for eyeglasses having a nose bridge, a pair of lenses in a frame and bow portions attached to said frame, said cleaning device comprising:
   a housing defining a fluid-receiving bowl with a generally vertical side wall;
   rack means mounted within said bowl for rotational and axial movement therein, said rack means being adapted to detachably support a pair of eyeglasses with the frame and lenses thereof in a generally horizontal attitude, said rack means including means for supporting the nose bridge of said eyeglasses substantially adjacent the rotational axis of said rack means and bow cage means for constraining the upstanding bow portions of said eyeglasses against lateral movement during rotation of said rack means; and
   means for so moving said rack means.

2. A cleaning device for eyeglasses as defined in claim 1 wherein said bow cage means includes a pair of opposed U-shaped sections each having a side substantially adjacent the rotational axis of said rack means and a relatively flexible free side, said free sides of said bow cage means being adapted to laterally receive the bow portions of said eyeglasses with the curved portions of said U-shaped sections constraining said bow portions against lateral movement during rotation of said rack means.

3. The cleaning device for eyeglasses of claim 1 wherein said means for moving said rack means includes actuating means for longitudinally moving said rack means and a separately operable drive means for rotating said rack means.

4. The cleaning device of eyeglasses of claim 1 including friction clutch means for selectively and automatically operating said means for moving said rack means at cleaning and spin-drying speeds.

5. A cleaning device for eyeglasses having a nose bridge, a pair of lenses in a frame and bow portions attached to said frame, said cleaning device comprising:
   a housing defining a fluid-receiving bowl with a bottom and a generally vertical side wall, said bowl having a generally annular, interrupted depression extending outwardly from said side wall with increasing concavity from one interruption to immediately adjacent the next following interruption;
   a rack means mounted within said bowl for rotational movement theerin with a vertical spindle means extending through the bottom of said bowl, said rack means being adapted to detachably support a pair of eyeglasses with the frame and lenses thereof in a generally horizontal plane, said rack means including means for supporting the nose bridge of said eyeglasses substantially adjacent said spindle means and bow cage means for constraining the upstanding bow portions of said eyeglasses against lateral movement during rotation of said rack means;

actuating means cooperating with said spindle means to longitudinally move said rack means selectively to cleaning and spin-drying positions; and drive means for cooperating with said spindle means of said rack means to rotationally move said rack means.

6. The cleaning device for eyeglasses of claim 5 including friction clutch means for selectively and automatically operating said drive means at cleaning and spin-drying speeds.

7. The cleaning device for eyeglasses of claim 5 wherein said rack means includes support means adapted to detachably engage and hold the nose bridge of the eyeglasses adjacent said spindle means; and said bow cage means includes a pair of opposed U-shaped sections each having a common side attached to said spindle means and a relatively flexible free side, said free sides being adapted to laterally receive the bow portions of the eyeglasses with the curved portions of said U-shaped sections constraining said bow portions against lateral movement during rotation of said rack means.

8. The cleaning device for eyeglasses of claim 5 wherein said drive means includes a friction clutch and pulley assembly for rotationally coupling said drive means to said spindle.

9. A cleaning device for eyeglasses as defined in claim 1 wherein said rack means includes:

a spindle means substantially coincident with the rotational axis of said rack means;

support means having a generally radially extending portion for vertically supporting the nose bridge of said eyeglasses substantially adjacent said spindle means and a generally upstanding portion for constraining radial movement of the nose bridge during rotation of said spindle means; and said bow cage means includes a pair of opposed U-shaped sections spaced above said support means, each of said sections having a common side attached to said spindle means, a curved portion and a free side, said common sides and curved portions being relatively stiff to constrain the bow portions of said eyeglasses against lateral movement during rotation of said rack means and supported eyeglasses, and said free sides being relatively flexible and adapted to yieldingly receive said bow portions of said eyeglasses generally adjacent said spindle means.

10. The cleaning device for eyeglasses of claim 1 wherein said rack means includes:

a spindle means substantially coincident with the axis of rotation of said rack means;

support means extending from said spindle means in a generally outwardly and upwardly attitude for vertically supporting the nose bridge of said eyeglasses and horizontally constraining the nose bridge against lateral movement during rotation of said rack means; and said bow cage means includes a pair of laterally opposed members extending from said spindle means having relatively flexible portions adapted to laterally receive and constrain the bow portions against lateral movement during rotation of said rack means.

References Cited

UNITED STATES PATENTS

| | | | |
|---|---|---|---|
| 1,277,603 | 9/1918 | Kirby | 68—23 |
| 1,907,411 | 5/1933 | Timoney | 15—3 |
| 2,082,991 | 6/1937 | Turco | 15—39 |
| 2,101,634 | 12/1937 | Aldridge | 68—148 |
| 2,994,329 | 8/1961 | Catlin et al. | 134—57 X |
| 3,054,412 | 9/1962 | Nickell | 134—137 |
| 2,109,501 | 3/1938 | Osius | 259—108 |
| 2,757,909 | 8/1956 | Wayne | 259—107 |

WALTER A. SCHEEL, Primary Examiner

L. G. MACHLIN, Assistant Examiner

U.S. Cl. X.R.

15—3; 134—135, 149, 157